June 3, 1958 J. E. McLAUGHLIN ET AL 2,836,934
MEANS FOR INTERCEPTING GOBS OF MOLTEN GLASS
Filed Dec. 13, 1955 4 Sheets-Sheet 2

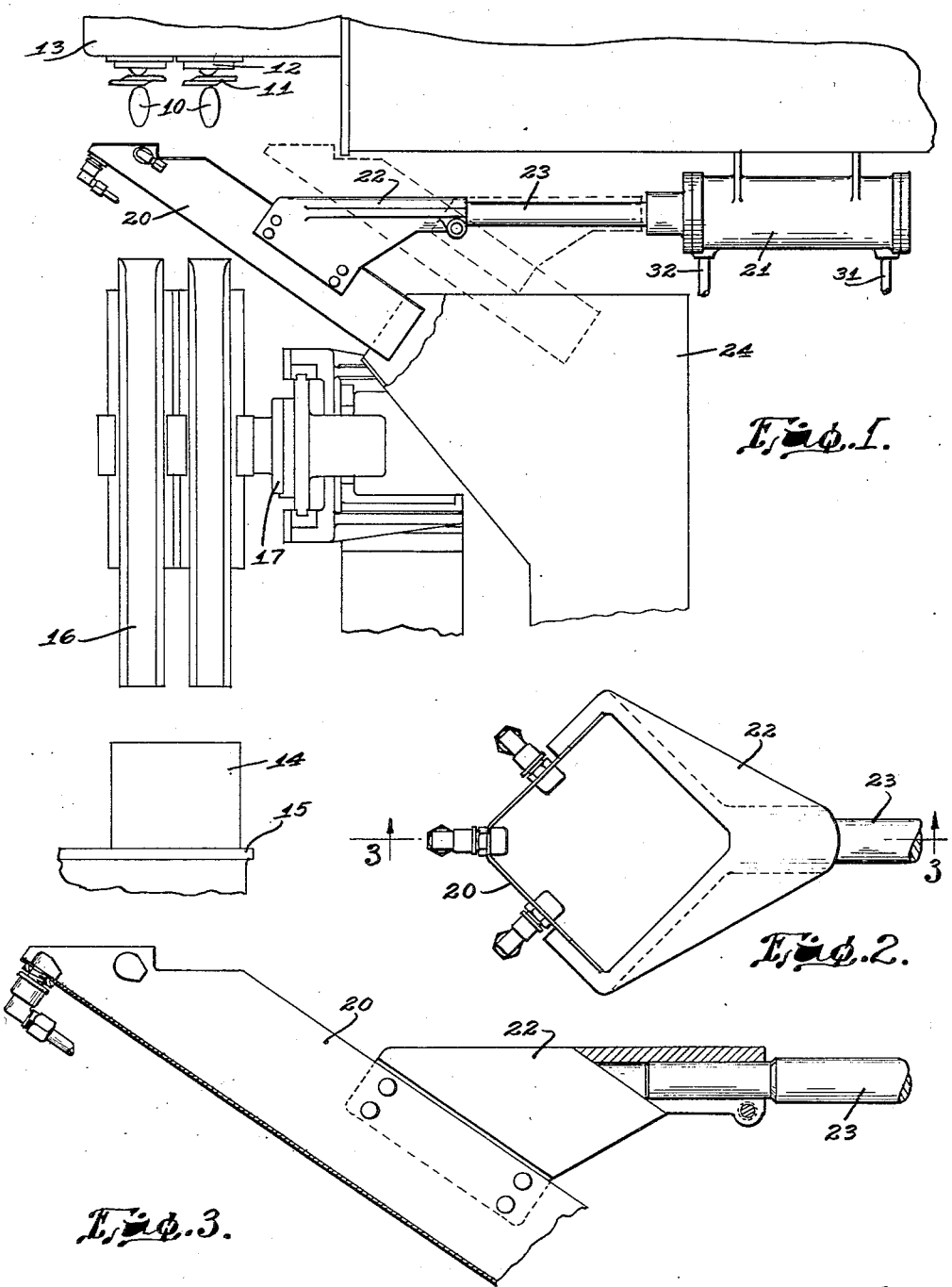

INVENTORS
J. E. McLAUGHLIN
G. H. ALLGEYER
BY
Rule and Hoge
ATTORNEYS

June 3, 1958    J. E. McLAUGHLIN ET AL    2,836,934
MEANS FOR INTERCEPTING GOBS OF MOLTEN GLASS
Filed Dec. 13, 1955    4 Sheets-Sheet 3

INVENTORS
J. E. McLAUGHLIN
G. H. ALLGEYER
BY
Rule + Hoge,
ATTORNEYS

June 3, 1958  J. E. McLAUGHLIN ET AL  2,836,934
MEANS FOR INTERCEPTING GOBS OF MOLTEN GLASS
Filed Dec. 13, 1955  4 Sheets-Sheet 4

INVENTORS
J. E. McLAUGHLIN
G. H. ALLGEYER
BY
ATTORNEYS

United States Patent Office 2,836,934
Patented June 3, 1958

2,836,934

MEANS FOR INTERCEPTING GOBS OF MOLTEN GLASS

John E. McLaughlin, Alton, Ill., and Guy H. Allgeyer, Toledo, Ohio, assignors to Owens-Illinois Glass Company, a corporation of Ohio Application December 13, 1955, Serial No. 552,903

11 Claims. (Cl. 49—5)

Our invention relates to means for intercepting mold charges or gobs of molten glass which are severed from a feeder to prevent them from being directed in their normal paths into traveling molds on a forming machine, together with timing means selectively operable for intercepting and directing the gobs away from any one or more or all of the individual molds as desired. The invention is of use with apparatus of the type in which mold charges or gobs of molten glass are severed by the shears of a feeder mechanism as the glass issues from a bottom outlet in a furnace forehearth, the gobs as they drop being guided into the open molds on a rotating mold carriage.

With machines of this type it is often desirable to prevent the gobs from being delivered to one or more selected molds without interfering with the continuous rotation of the mold carriage. The present invention provides an intercepting device for this purpose in the form of a trough or chute which is adapted to be projected into the path of the falling gobs in timed relation to the operation of the feeder shears and the rotation of the mold carriage which is synchronized with the operations of the shears.

The invention is particularly adapted for use with machines in which the mold carriage is rotated at a high speed and the mold charges or gobs severed and dropped into the molds in rapid succession as the molds pass beneath the feeder, means being provided for guiding the gobs accurately into the molds as they are transferred by gravity from the feeder to the molds thereneath. The interceptor is operated preferably by an air motor by which it is reciprocated into and out of the path of the falling gobs. The air motor is under the control of a solenoid valve. An electrical control system provides selective means including switches individual to the molds or mold units on the carriage. These switches may be selectively operated manually to cause selective operation of the interceptor by which the falling gobs are detoured from any selected mold or molds and dropped into a cullet chute.

Referring to the accompanying drawings:

Fig. 1 is an elevational view showing the interceptor and its relation to the gob feeder and mold carriage;

Fig. 2 is a plan view of the interceptor;

Fig. 3 is a section at the line 3—3 on Fig. 2;

Figure 4:
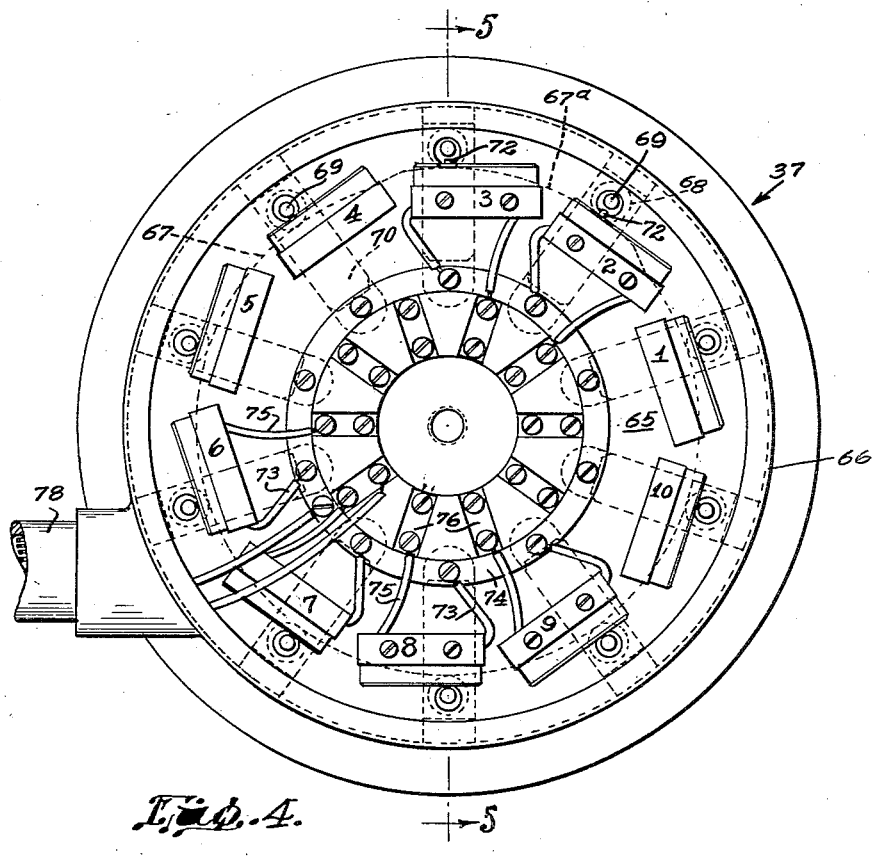
Fig. 4 is a plan view of a sequence timing unit assembly.

Referring to Fig. 1, mold charges or gobs 10 of molten glass are severed by shears 11 of a gob feeder 12 as the glass is delivered through bottom outlets in a furnace forehearth 13. The gobs drop by gravity to the open molds 14 which may be mounted and arranged in an annular series on a mold carriage 15 (Fig. 8) rotatable continuously about a vertical axis. As shown, two gobs 10 are severed simultaneously at each shearing operation for delivery into the plural cavities of the molds. Vertically disposed guides 16 serve to guide the falling gobs accurately into the mold cavities. These guides are mounted on the carrier 17 which is reciprocated in timed relation to the delivery of the gobs for imparting a forward movement to the gobs corresponding to that of the molds. The interceptor 20, which as shown is in the form of an inclined trough or chute, is mounted for horizontal reciprocation by a piston motor or cylinder 21. The cylinder has a stationary mounting beneath the furnace forehearth. The interceptor 20 is connected by a shoe 22 to the piston rod 23 of the motor. The discharge end of the trough 20 is positioned over a stationary cullet chute 24.

Figure 7:
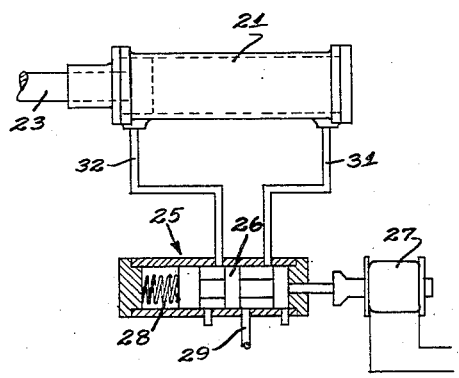
Fig. 7 is a part sectional diagrammatic view of an air motor for operating the interceptor and a solenoid control valve for the motor.

Referring to Fig. 7, the piston motor 21 is under the control of a solenoid valve 25 including a valve piston 26 operated in one direction by a solenoid 27 and in the opposite direction by a coil spring 28. Air under pressure is supplied to the valve through a pressure line 29. With the valve piston in the position shown, pressure is supplied through the valve and line 31 to the right-hand end of the cylinder 21 for projecting the interceptor chute 20 forward to the position shown in full lines (Fig. 1). When the solenoid 27 is energized the valve piston is moved to the left, compressing the spring 28 and connecting the pressure line 29 through pipe 32 for retracting the trough 20 to the broken line position (Fig. 1) out of the path of the gobs.

Figure 8:
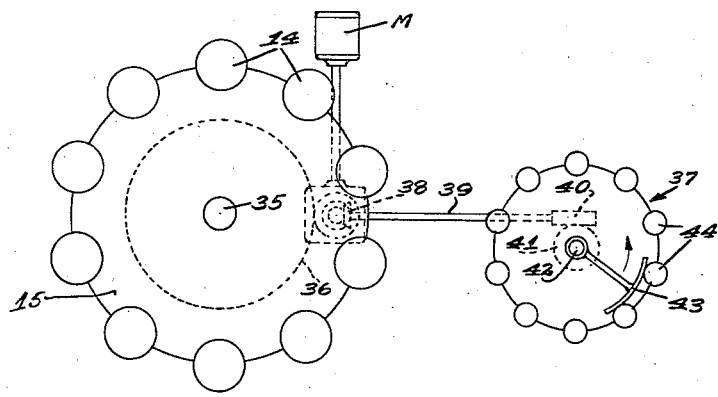
Fig. 8 is a schematic view showing the mold carriage, the sequence timing unit assembly and the interconnected driving mechanism between said parts.

Referring to Fig. 8, the mold carriage 15 is rotated continuously by the main motor M having driving connection with the mold carriage through a train of gearing including a bull gear 36 on the shaft 35 of the mold carriage. The sequence timing unit assembly 37 (shown in detail in Figs. 4 and 5) is herein referred to as a timer. Driving connections between the gear 36 and the timer are schematically shown as comprising a gear train including gears 38, a shaft 39, worm 40, and worm gear 41 attached to the timer shaft 42. The gears are so proportioned that the shaft 42 rotates at the same angular speed as the carriage shaft 35. A contact bar 43 connected to the shaft 42 makes electrical contact with switch elements 44 having a stationary mounting. The elements 44 are equal in number to and individual to the mold units 14 and selectively control the operation of the interceptor as described hereinafter.

Figure 9:
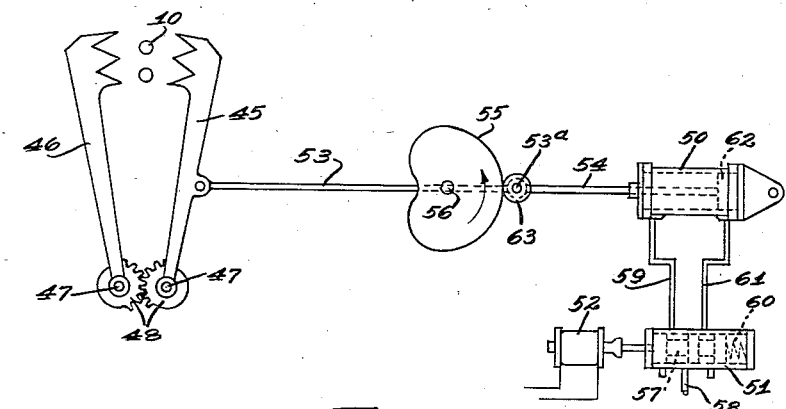
Fig. 9 is a schematic view of the shears and their operating mechanism.

Referring to Fig. 9, the shear mechanism comprises a pair of shear arms 45 and 46 mounted to swing about pivots 47, the arms having driving connection through gear segments 48. The shear arms are moved to shearing position by an air cylinder 50, such movement being, as presently described, under the control of a shear cam 55 on a rotating cam shaft 56. The shear arms are retracted by the cam 55. The air cylinder 50 operates under the control of a solenoid valve 51 operated by a solenoid 52. A connecting rod 53 is attached at one end to the shear arm 45 and at its opposite end to a shaft 53ᵃ on which is a cam follower roll 63. The piston rod 54 is attached at its outer end to the shaft 53ᵃ. The solenoid valve 51 comprises a piston 57 which, while the solenoid is deenergized, is moved to the left, as shown, by a spring 60. This admits air under pressure through the pressure line 58 and pipe 59 to the cylinder 50 thereby holding the shear arms in open position. When the solenoid 52 is energized it moves the valve piston 57 to the right thereby compressing spring 60 and opening the pressure line 58 through a pipe 61 to the right-hand end of the cylinder 50 so that the piston 62 applies a continuous pressure through the piston rod 54, holding the cam follower roll 63 on the cam 55. The cam 55 is continuously driven while the machine is in operation and makes one complete rotation while the mold carriage rotates through the angular distance between adjacent mold units. The cam follower roll 63 being held on the cam, the shears are moved to closed position by air pressure under the control of the cam and are returned to open position by the positive operation of the cam which works against the air pressure in the cylinder 50. During the normal operation of the machine, the solenoid 52 remains energized so that the cylinder 50 operates continuously to hold the cam follower roll 63 on the rotating shear cam 55.

Figure 5:
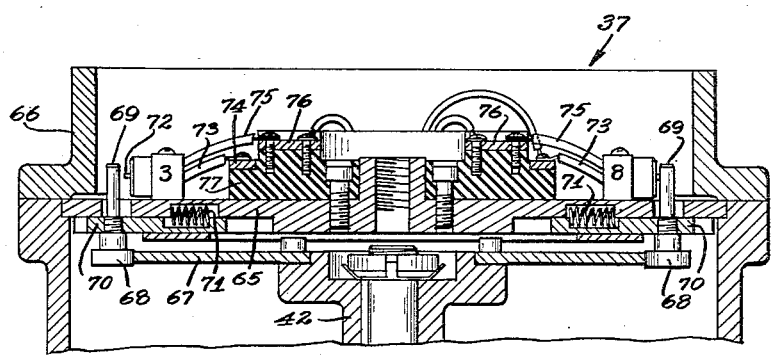
Fig. 5 is a section at the line 5—5 on Fig. 4.

Referring to Figs. 4 and 5 the sequence timing unit assembly or timer comprises the microswitches numbered 1 to 10 inclusive mounted on a stationary disk 65 with the switches arranged in a circle or annular series, the switches being individual to the molds 14 on the carriage. The disk 65 is mounted in a stationary cylindrical case 66. The shaft 42, which as above described is geared to rotate in synchronism with the mold carriage, has mounted thereon a cam 67 on which run cam follower rolls 68. These rolls are carried on vertical contact pins 69, the pins being mounted in slide plates 70. The slide plates are mounted for radial sliding movement on the under side of the stationary disk 65. Coil springs 71, held under compression between the slides and the disk 65, hold the cam rolls 68 against the cam 67.

Each of the microswitches includes a switch operating element or pin 72 which projects outwardly therefrom while the switch is closed, inward movement of the pin serving to open the switch. The contact pins 69 individual to the microswitches are positioned opposite the pins 72. The cam 67 is so contoured that during its rotation it permits each contact pin 69 to be moved radially inward and held in its inward position by the associated spring 71 during a major portion of a complete rotation of the cam, thereby holding the adjoining microswitch open. The cam 67 is formed with a high portion 67ª (Fig. 4) which, as the cam rotates, moves each contact pin 69 outwardly, allowing the associated pin 72 to be moved outward, thereby closing the microswitch.

The high section 67ª of the cam is of such length that each pin 69 is held in its outward position until the next succeeding pin 69 has been moved outward by the cam. Thus as shown on Fig. 4 the pins 69 opposite the microswitches 2 and 3 are both in their outward position so that both of the microswitches are closed. The purpose of this arrangement is set forth hereinafter.

Figure 6:
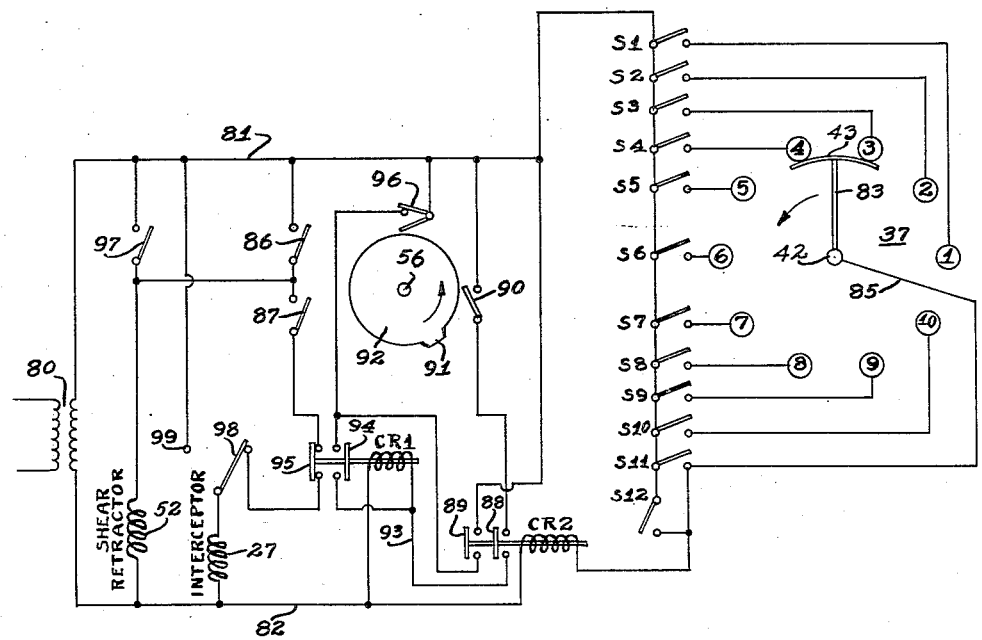
Fig. 6 is a wiring diagram of the electrical system.

All the microswitches 1 to 10 have one side connected through a lead 73 to a conductor 74, shown as a metal ring. The other sides of the switches are connected through leads 75 to contact bars 76 mounted on an insulating disk 77. The bars 76 and ring 74 are connected by conductors, through a cable 78, to a panel board at any convenient position where they are connected to manual switches or push buttons designated S1 to S11 inclusive (Fig. 6).

The electrical control system, Fig. 6, will now be described. The power for operating the various control devices is supplied through a transformer 80. The several solenoids are connected through the control switches across the mains 81 and 82 of the transformer secondary winding. The timer shaft 42 is connected by an arm 83 to the contact bar 43 which as the shaft rotates engages the stationary contacts or switches 1 to 10 in succession. The contact bar 43 is of a length to bridge each two adjacent switches or contacts so that each switch is closed before the preceding switch is opened. Each microswitch in succession is connected in a circuit normally open at the corresponding one of the switches S1 to S10, the circuit extending through the conducting arm 83, a lead 85, a contact relay coil CR2 to the main 82.

The various switches and relays are shown in the positions assumed while the main motor M (Fig. 8) which drives the mold carriage is at rest. Switches 86 and 87 in the starting circuit of the main motor are closed when the motor is started and remain closed while the motor is running. When it is desired to intercept the gobs being delivered to any particular mold unit while the machine is operating, the operator closes that one of the switches S1 to S10 which corresponds to such mold unit. If, for example, the mold unit corresponding to switch 4 is selected, the switch S4 is closed by the operator. While this switch is held closed the rotating contact bar 43 is brought into position to close the switch 4, thereby establishing a circuit for the contact relay coil CR2. This circuit may be traced from the main 81 through switch S4, switch 4, arm 83, lead 85 and coil CR2 to main 82. The relay coil being energized moves its contact bars 88, 89 to closed position. The contact bar 88 is in circuit with a normally open limit switch 90 which is periodically closed by a cam lobe 91 on a timer cam disk 92 keyed to the cam shaft 56 which, as heretofore described, controls the shear operations. While the manual switch S4 is held closed the cam 91 as it rotates, closes the switch 90 and completes a circuit extending from the main 81 through switch 90, contact bar 88, lead 93 and a contact relay coil CR1. This contact relay moves its contact bar 94 to closed position and contact bar 95 to open position. The contact bar 94 completes a holding or locking circuit for the coil CR1, such circuit extending from the main 81 through a normally closed limit switch 96 so that coil CR1 remains energized independently of the contact relay CR2.

The movement of the contact bar 95 to open position opens the circuit through the valve solenoid 27 which, as before described, is normally in a closed circuit. The solenoid valve 26 therefore is moved to the right, Fig. 7, so that the cylinder 21 operates to project the interceptor to the operative position beneath the feeder. This operation is timed to intercept the mold charges or gobs 10 which otherwise would enter the mold corresponding to switch 4. The interceptor remains in its forward position until the cam 91 reaches and opens the normally closed switch 96. This breaks the holding circuit through the relay coil CR1 so that the relay contact bar 95 is returned to closed position, thus completing the circuit through the solenoid 27. The solenoid therefore operates its piston, compressing the spring 28 (Fig. 7), connecting the pipe 32 to pressure so that the cylinder 21 retracts the interceptor 20. This completes the cycle of operations for effecting a single forward and return movement of the interceptor. The intercepted gobs are directed into the cullet chute 24. The interceptor will continue to operate to intercept the gobs each time the selected mold is brought into position beneath the feeder, so long as the selected switch is held closed.

If it is desired to intercept the gobs being delivered to two adjoining molds the corresponding switches, for example, S3 and S4 are closed. In this event the traveling contact bar 43 completes the circuit for switch 4 before passing off switch 3. The relays CR2 and CR1, energized by the closing of switch 3, therefore remain energized till after the switch 4 is closed. As a result the interceptor remains in its projected operative position until the mold charges for the two mold units have been intercepted. In this connection it should be noted that owing to the rapid delivery of mold charges or gobs there is insufficient time for a reciprocation of the interceptor for each succeeding mold charge, and particularly so as the glass issuing from the feeder outlet quickly elongates downwardly into the path of the interceptor. The operation of the interceptor is so timed that it moves into gob intercepting position immediately after one severed charge has dropped out of the way, the interceptor being well advanced toward its operative position before the next succeeding charges or gobs are severed. Any selected number of the switches 1 to 10 may be held closed concurrently for intercepting the mold charges for the corresponding mold units.

When it is desired to intercept all of the mold charges while the machine is running, switch S11 is closed so that the contact relay coil CR2 remains energized and the interceptor remains in its projected position for deflecting all of the issuing mold charges into the cullet chute 24. A switch S12 in parallel circuit with the S11 may serve as a remote control switch, being located at any convenient position for operating the interceptor.

When the main motor is stopped the normally open contacts 86 and 87 on the motor starter switch are, as before noted, open so that the circuit for the shear retractor solenoid 52 is open at the switch 86, whereby the shear blades remain in open position. The shear may be operated by closing a switch 97, thereby establishing a circuit for the switch retractor coil 52.

An emergency switch 98 in circuit with the interceptor solenoid 27 may be shifted to engage a contact 99 thus completing a circuit for the coil 27 directly across the mains so that the interceptor is retracted and held in its inoperative position.

Modifications may be resorted to within the spirit and scope of our invention.

We claim:

1. The combination of a mold carriage, molds thereon, means for driving the carriage and bringing the molds periodically to a charge receiving station, means for delivering mold charges to the mold at said station, a normally inactive intercepting device, means for moving said intercepting device into and out of the path of the mold charges in synchronism with the movement of the molds to the charging station, electroresponsive means controlling the said means for moving the intercepting device, and manual means for bringing said electroresponsive means into activity.

2. The combination of a mold carriage, molds thereon, means for rotating the carriage and bringing the molds in succession to a charge receiving station, means for delivering mold charges and transferring them in a predetermined path to the molds at said station, and interceptor movable into and out of the said path for intercepting mold charges and directing them away from the molds, a timer device comprising switches individual to the molds and means for operating the switches in succession in timed relation to the bringing of the molds to said station, an electroresponsive device controlling the operation of the interceptor, means providing electrical circuit connections between the electroresponsive device and said switches, and manually operable circuit closing devices in circuit with said switches and selectively operable for effecting the operation of the interceptor.

3. The combination of a mold carriage mounted for rotation, molds thereon, means for rotating the mold carriage and thereby bringing the molds in succession to a charge receiving station, means for delivering mold charges through a predetermined path to the molds at said station, an interceptor movable into and out of said path, means for operating the interceptor, a timer device comprising switches individual to the molds, the timer device comprising means operable in synchronism with the rotation of the mold carriage for actuating said switches in succession, electroresponsive means controlling the operation of the interceptor, manually operable circuit closing devices individual to said switches, electroresponsive means in circuit with said circuit closing devices and switches for controlling the operation of said interceptor, said circuit closing devices being selectively operable for causing selective operation of the interceptor and thereby intercepting the mold charges for any selected mold or molds.

4. The combination defined in claim 3, the means for operating the interceptor comprising a piston motor, the means for controlling the operation of the interceptor comprising a solenoid valve and a solenoid operatively connected thereto.

5. The combination of a mold carriage mounted for rotation about a vertical axis, molds thereon arranged in an annular series, means for continuously rotating the mold carriage about its axis and thereby moving the molds in succession through a charge receiving station, means for delivering mold charges and transferring them in a predetermined path to the molds at said station, an interceptor movable into and out of said path, means for operating the interceptor, electroresponsive means controlling the operation of the interceptor, a timer device including switches individual to the molds and a switch operating device, means forming driving connections between the switch operating device and the mold carriage for driving said switch operating device and causing it to operate the switches singly and in succession in timed relation to the movements of the molds through the charge receiving station, and manually operable circuit closing devices individual to and in circuit with said switches and operable to control the operation of said electro-responsive means and thereby effect the operation of the interceptor.

6. The combination set forth in claim 5, the means for controlling the operation of the interceptor comprising a solenoid valve and a solenoid operatively connected to the valve.

7. The combination set forth in claim 5, the said timer device comprising a stationary support on which the switches are mounted and arranged in an annular series, a rotary element, means for rotating said element in synchronism with the rotation of the mold carriage, and means actuated by said element for operating said switches singly and in succession.

8. The apparatus defined in claim 5, the timer device comprising a stationary support on which the switches are mounted and arranged in an annular series, switch operating elements individual to said switches, a rotary cam, and means providing driving connections between the mold carriage and cam for rotating the cam in synchronism with the mold carriage, said cam being shaped and arranged to operate said switch operating elements singly and in succession.

9. The combination of a mold carriage rotatable about a vertical axis, means for rotating the carriage, molds mounted on the carriage and brought in succession to a charge receiving station by the rotation of the carriage, means for delivering mold charges and transferring them along a predetermined path to the molds at said station, an interceptor movable into and out of said path, a motor for operating the interceptor, a solenoid valve controlling the operation of said motor, a solenoid connected to operate said valve, a timer mechanism including electrical contact devices individual to the molds, a contact operating element, means providing driving connection between said operating element and mold carriage for driving said element and operating said contact devices singly and in succession in synchronism with the movements of the molds through the charge receiving station, manually operated switches individual to said contact devices, said solenoid being in circuit with said switches, the switches being selectively operable to establish a circuit for said solenoid when a corresponding contact device is actuated.

10. The combination of a mold, means for moving the mold and carrying it intermittently through a charge receiving position, means for delivering mold charges and directing them to the mold, an interceptor, a piston motor, said interceptor connected to the motor piston and movable thereby into and out of the path of the mold charges, a solenoid valve controlling the supply of an operating fluid to the motor, a valve solenoid operatively connected to said valve, an electromagnetic relay comprising a coil and switch, the switch being in circuit with the valve solenoid, a timer, means for driving the timer in synchronism with the movement of the mold, a timer switch operable by the timer, and manually operable means for establishing a circuit for the timer switch and the relay coil.

11. The combination of a mold carriage mounted for rotation about a vertical axis, molds on the carriage, means for rotating the carriage and bringing the molds in succession to a charge receiving station, a gob feeder mounted above the path of the molds and including a shear mechanism for severing gobs and permitting them to drop to the molds therebeneath at said station, means for periodically operating the shear mechanism in synchronism with the movements of the mold carriage for severing the mold charges, said means for operating the shear mechanism comprising a fluid operated shear motor operatively connected to the shear mechanism, a solenoid valve and solenoid controlling the operation of the said motor, an interceptor mounted for movement into and out of the path of the mold charges at said station, a fluid operated interceptor motor for operating the interceptor, a solenoid valve and solenoid controlling the operation of said last mentioned motor, a timer mechanism including timer switches individual to the molds, manually operable switches individual to and in circuit with the said timer switches, and means in circuit with said switches controlling the operation of the said solenoid which controls the operation of the interceptor motor.

References Cited in the file of this patent

UNITED STATES PATENTS

| | | |
|---|---|---|
| 2,047,507 | Howard | July 14, 1936 |
| 2,370,381 | Vaughan | Feb. 27, 1945 |